United States Patent [19]
Morris

[11] Patent Number: 5,355,193
[45] Date of Patent: Oct. 11, 1994

[54] FILM CODE READER ASSEMBLY FOR A FILM SCANNER

[75] Inventor: William I. Morris, Oakfield, N.Y.

[73] Assignee: Eastman Kodak Company, Rochester, N.Y.

[21] Appl. No.: 139,369

[22] Filed: Oct. 20, 1993

[51] Int. Cl.⁵ .......................................... G03B 27/52
[52] U.S. Cl. .................................................. 355/41
[58] Field of Search ............................ 355/40, 41, 42

[56] References Cited

U.S. PATENT DOCUMENTS

| | | | |
|---|---|---|---|
| 4,189,228 | 2/1980 | Farrell | 355/41 |
| 4,264,197 | 4/1981 | Pone et al. | 355/41 |
| 4,994,850 | 2/1991 | Imamura et al. | 355/41 |
| 5,038,167 | 8/1991 | Suzuki | 355/41 |
| 5,164,574 | 11/1992 | Ujiie et al. | 235/462 |

Primary Examiner—Michael L. Gellner
Assistant Examiner—Daniel Patrick Malley
Attorney, Agent, or Firm—Raymond L. Owens

[57] ABSTRACT

A film code reader assembly for a film scanner provides film path for accurately guiding the scanning film past a film code reading location where optically readable film codes are extracted by a code reader. The assembly self-aligns the film code reader in a direction perpendicular to the scanning direction of the film, and orients film film code reader with respect to the film code-bearing edge of the scanning film.

12 Claims, 10 Drawing Sheets

FILM CODE READER ASSEMBLY FOR A FILM SCANNER

FIELD OF THE INVENTION

The present invention generally relates to a high-speed film scanner, and more particularly to a film code reader assembly installed in a film scanner for reading film codes inscribed along either one of two film edges in the film scanning direction.

BACKGROUND OF THE INVENTION

Several major technological advances have resulted in significant changes in equipment and operating procedures of commercial photofinishing systems. In the past, a customer's exposed film would be dropped off or mailed to a photofinishing center, where the film was developed, and photographic prints were then produced by printing the image frames on the developed photographic negative onto photographic paper in a multi-step optical projection sequence. As technology advanced, analog images could be transformed into digital image information by various optical scanning means. The ability to render photographic images in digital form accelerated the evolution of processes and materials which became advantageous for recording the digital information of the images on the film on a variety of media and by an assortment of techniques. For example, digital image information can now be recorded on optical disks or photo compact discs, as well as on photographic paper by devices such as digitally addressable high-speed laser printers.

It is these rapidly advancing technologies which have had a significant impact on commercial photofinishing operations. Today, a photofinisher will develop films from many customers and splice these films together so as to form a single large reel of spliced film to be deployed as a film supply reel in a high-speed film scanner. All individual sections of film on such a reel are of one and the same nominal width, for example, 35 mm film, but are typically of different section length, for example, 12 exposures, 24 exposures, or 36 exposures. Individual film sections may have a particular film speed rating (for example, ASA 100 to ASA 1000) and frequently include films by different manufacturers. Film manufacturers have established on a worldwide basis standards and specifications for splicing of films and splicing tolerances, i.e., the degree of allowable lateral offset at the splice of spliced sections perpendicular to the length of the spliced film, as well as allowable angular deviations among two adjacent spliced film sections.

When the very first splice joins two film sections such that the last frame of the first section joins the first frame of the second section, all subsequent film sections are spliced in the same manner, thereby providing a film supply reel with a "first frame first" (F.F.F.) configuration. When the first splice joins the first frame of the first film to the last frame of the second film, the completed film supply reel is said to be in a "last frame first" (L.F.F.) configuration. With respect to the emulsion face of film image frames, all optical film codes along one edge of each film section will be presented at one side for F.F.F. and the opposite side of the film for L.F.F. along the film path in a film scanner.

Suitable optical codes reflective of these film parameters are encoded during the film manufacturing process alongside each image frame of a film in proximity to one edge of the film. Thus, each image frame of a section of spliced film on a film supply reel can, in principle, be uniquely identified by its optical code as to film manufacturer, film speed rating, and number of frames on that film section. In the present invention this identification of image frames is performed by a film code reader assembly which is deposed in a film scanner at a location between the film supply reel and the film scanning module.

SUMMARY OF THE INVENTION

It is the principal object of the invention to provide a film code reader assembly in a film scanner to read optically readable film codes at uniform film screening speed.

Another object of the present invention is to provide a self-alignment feature for a film code reader of the film code reader assembly so as to maintain alignment of the code reader in response to positional variation of the scanning film in a direction perpendicular to the film scanning path within the film code reader.

A further object of the invention is to provide a pivotably rotating orientation means for orienting the film code reader with respect to the code-bearing edge of the film.

A still further object of the present invention is to provide a film path defining means within one film code reader member for effecting accurate film guiding past a film code reading location in the film code reader at uniform film scanning speeds.

These and other objects, features, and advantages are achieved in a film code reader assembly having the following major components with their associated functions:

mounting means for mounting the film code reader assembly to a mounting surface within a film scanner housing along the film path within the scanner at a position between a film supply reel and a scanning unit;

film code reading means defining a code reading location;

film path defining means for defining the path of the scanning film at the code reading location;

self-alignment means for maintaining alignment of the film code reading means in response to positional variation of the scanning film in a direction perpendicular to the scanning direction; and pivotably rotatable orienting means for orienting the film code reading means with respect to the one film edge having the film code.

BRIEF DESCRIPTION OF THE DRAWINGS

The present invention will be better understood and appreciated more fully from the following detailed description, taken in conjunction with the accompanying drawings, in which.

DETAILED DESCRIPTION OF THE PREFERRED EMBODIMENT

Figure 1:
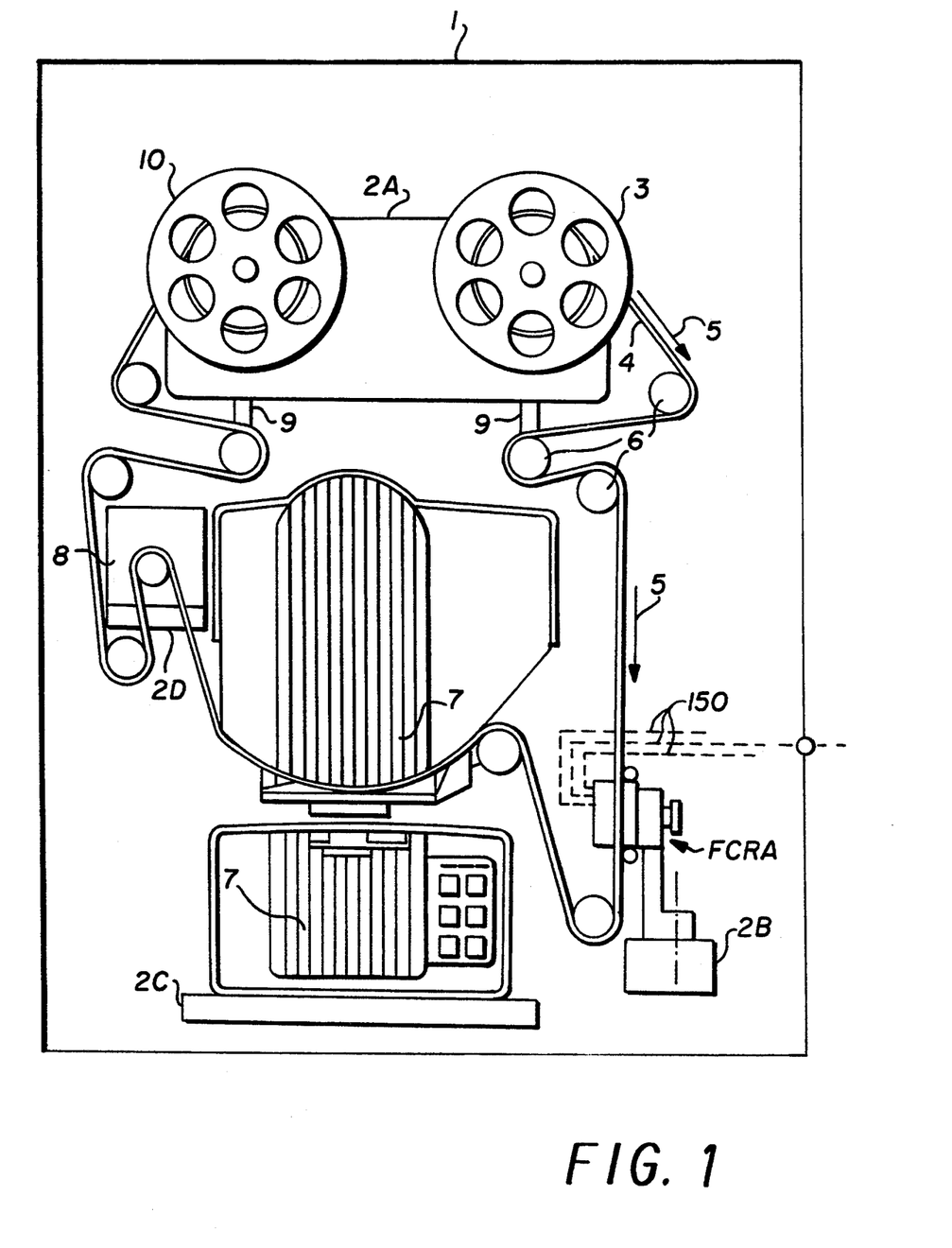
FIG. 1 is a schematic diagram of a high-volume film scanner, showing the film code reader assembly (FCRA) in accordance with the present invention, located between a film supply reel and a scanning unit.

Referring now to FIG. 1, there is indicated schematically a high-volume, automated film scanner, such as may be employed in large-scale photofinishing operations. The film scanner is contained in a housing 1 and has the following major components: internal mounting surfaces 2A, 2B, 2C, and 2D provide for mounting the components of the scanner. The scanner may also have a front or side access door. A film supply reel 3 supplies spliced film 4 along a film path 5 over an assembly of rollers 6 to the film code reader assembly (FCRA) of the present invention, to a film scanning station or unit, to a capstan film drive module 8, and finally to a film take-up reel 10. Film guide rollers 6 may be tensioned by a tensioning means 9.

Film supply reel 3 contains a large number of spliced films of nominal constant width, but of varying film length, film sensitivities or film speed ratings, and from various manufacturers. At the beginning of the reel is a leader (not shown) without image frames which is inserted along the film path 5 through the various components and brought to the take-up reel. At the end of the film supply reel 3 is an equally long film trailer (not shown). Operationally, the film scanner functions in two sequences: first, the entire film on supply reel 3 undergoes a relatively rapid, so-called, pre-scan whereby the film code reader reads all the film codes along one edge of each frame of the film, and providing digital signals representative of the film codes to signal storage means exterior of the scanner. At the same time, the scanning unit 7 performs a pre-scan over a central portion of each image frame on the passing film, so as to determine average light levels as might result in accordance with varying optical densities of each frame. Those light level determinations are stored as digital electronic signals in separate storage means. This pre-scan function occurs at typical film scan speeds in the range of 4–8 inches per second (10–20 centimeter per second). Upon completion of the pre-scan, the film is rewound from take-up reel 10 onto supply reel 3, during which both the film scanner unit 7 and the film code reader assembly are electrically deactivated. On a second pass, namely the main film scanning operation, the film code reader is electrically deactivated, previously stored film code data now being used to identify the appropriate film frame and associated parameters in the final image scan in the scan unit 7. This final image scan occurs while each frame remains temporarily stationary in the scanning gate of the film scan unit 7.

Figure 2:
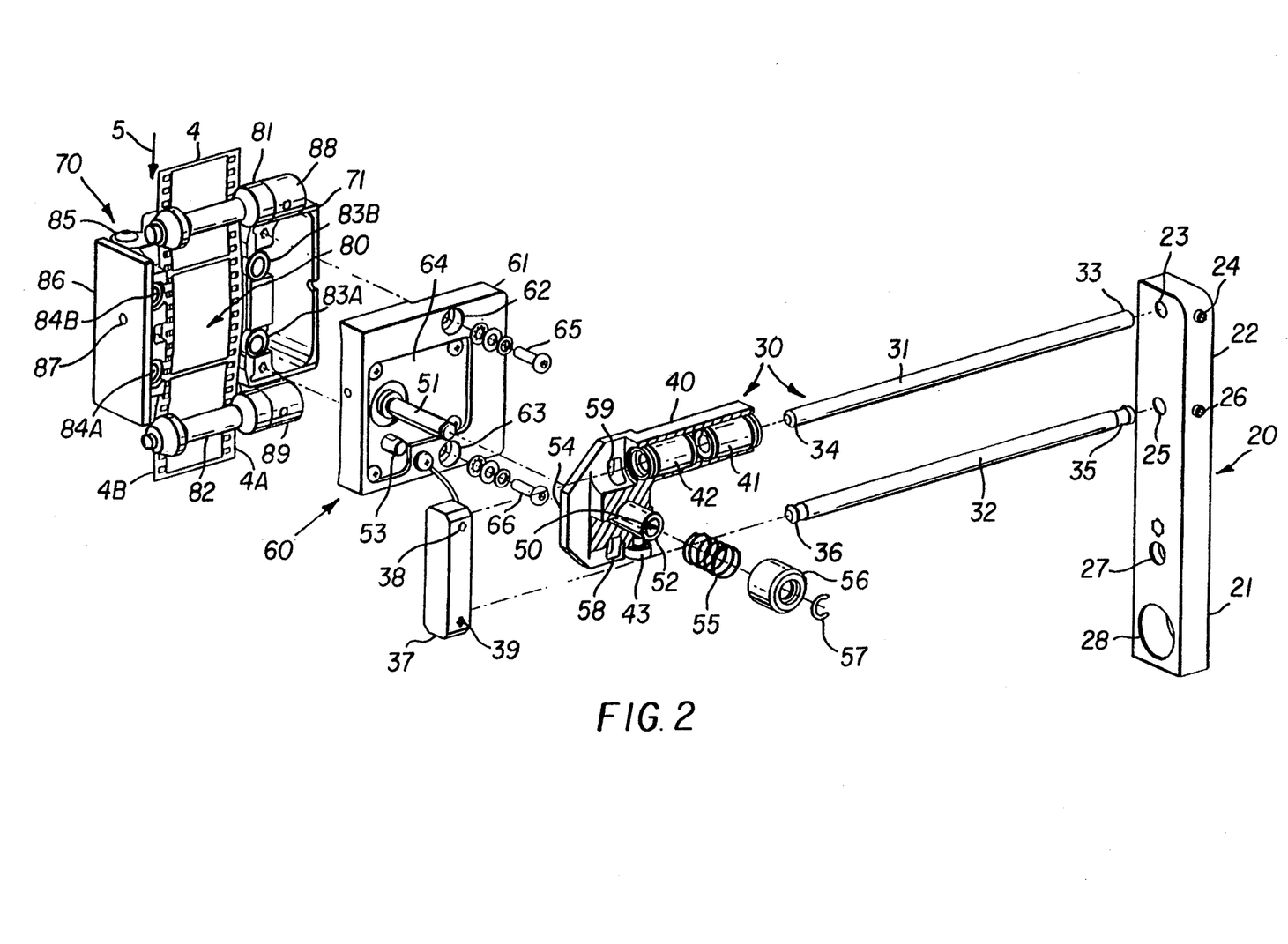
FIG. 2 is an exploded perspective view of the components of the film code reader assembly of the present invention.
Figure 3:
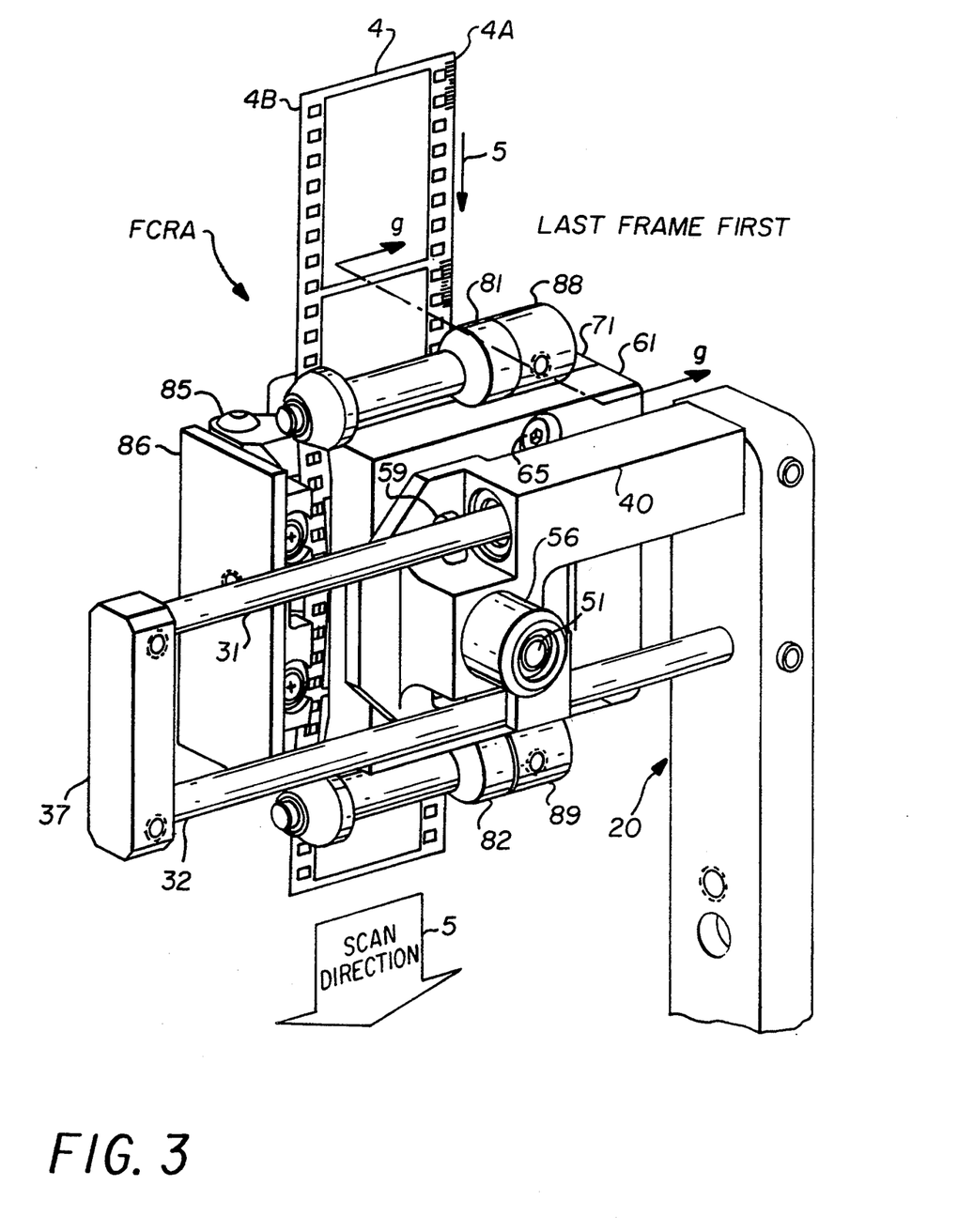
FIG. 3 is a perspective view of the film code reader assembly in accordance with the present invention, shown assembled and operating in a "last frame first" mode.
Figure 4:
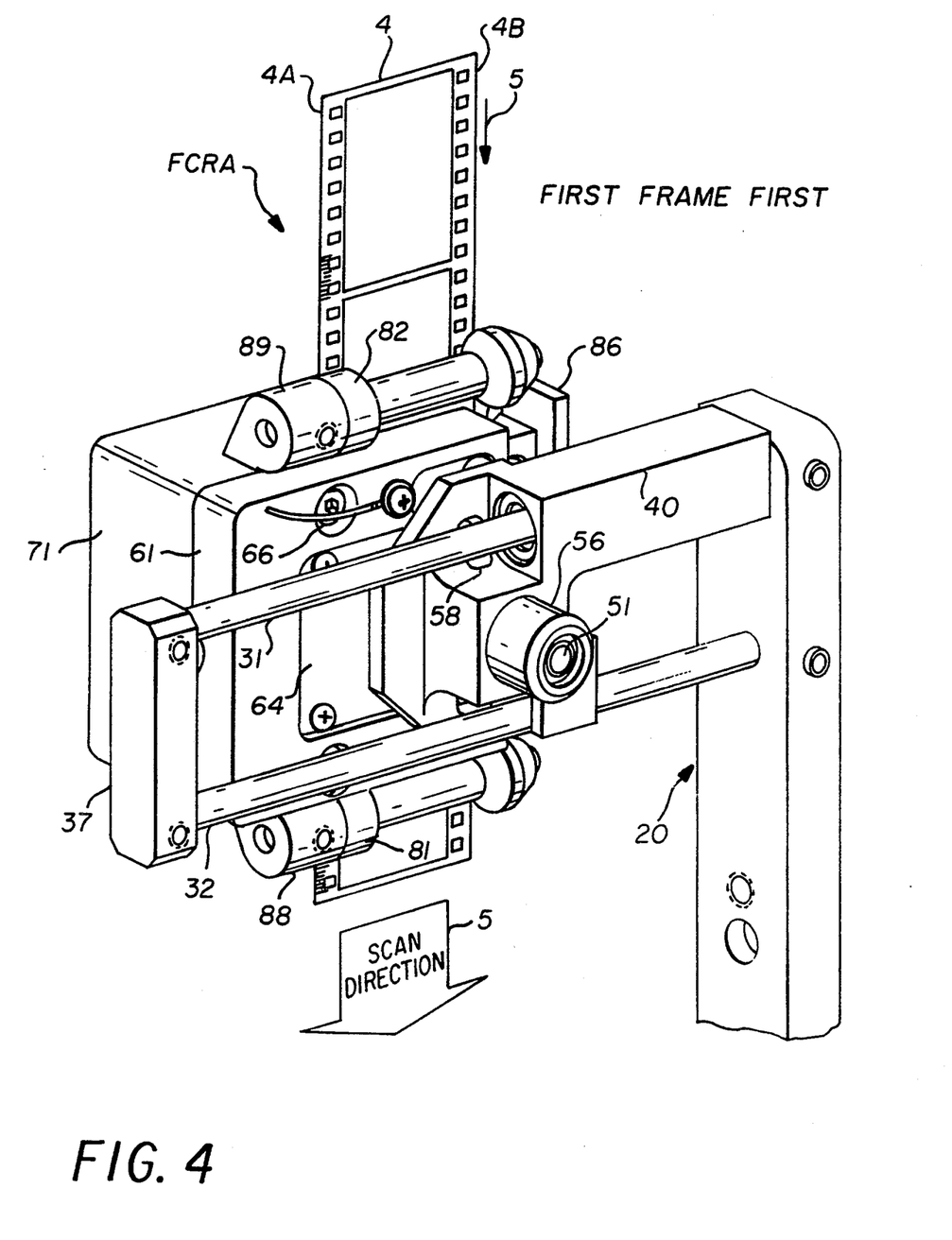
FIG. 4 shows the film code reading assembly in accordance with the invention, and operating in a "first frame first" film scanning mode.

Referring now to FIGS. 2, 3, and 4, there are shown the major components of the film code reader assembly in the exploded view of FIG. 2, and the completed assembly in a "last frame first" and a "first frame first" mode in FIGS. 3 and 4, respectively. Film code reader assembly FCRA has a mounting arm generally designated at 20 having a first portion 21 mounted to the internal mounting surface 2B in FIG. 1 by suitable means at locations 27 and 28. A second portion 22 of the mounting arm 20 serves to fasten a top guideshaft 31 and a parallel bottom guideshaft 32 at their respective ends 33 and 35 to arm portion 22 by seating in bores 23 and 25, the shafts being retained in the bores by retaining screws 24 and 26, respectively. A pivot block 40 contains two linear bearings 41 and 42, as well as a roller bearing 43. Pivot block 40 is axially and slidably inserted over the top and bottom guideshafts 31 and 32, whereupon an end block 37 is attached to guideshaft ends 34 and 36 by retaining screws 38 and 39, respectively, so as to confine these latter guideshaft ends and thereby retain the guideshafts in a parallel position. The pivot block 40 is also attached to a film code reading member 60. The axially slidable pivot block 40, together with guideshafts 31 and 32 is generally indicated at 30, and constitutes a self-alignment mechanism whereby the pivot block 40 can slide readily along guideshafts 31 and 32 in response to sideways displacement or motion of film 4, and hence of film code reading members 70 and 60, caused by non-uniformities of the film splices.

Another function of pivot block 40 is to rotatably pivot about a pivot shaft 51 between two end positions 58 and 59 along a semi-circular locator pin guide channel 54, the guide channel being slidably engaged by a locator pin 53 which is deposed on a first member of the film code reader 61. Shaft 51 slidably extends through a central bore 50 and bushing 52 in pivot block 40, and shaft 51 is axially retained in pivot block 40 under the urging of a spring 55 by an end cap 56 and a shaft retainer 57.

Functionally the pivot block 40 has the previously indicated axial alignment capability and additionally allows for a rotational orientation of the film code reader between either of two positions at the termination of a 180° rotation.

As shown in FIGS. 3 and 4, rotation of pivot block 40 provides for reading a film code on films supplied by the film supply reel 3 in FIG. 1 either in a "last frame first" mode or in a "first frame first" mode.

The film code reader sub-assembly has two major components, namely a first film code reading member generally designated at 60 and a second film code reading member generally designated at 70. First film code reading member 60 has a structural frame 61 and mounting means 62 and 63 for fixedly attaching first film code reading member 60 to the structural frame 71 of second film code reading member 70. Additionally, film code reading member 60 has fixedly attached thereto both the pivot arm shaft 51 and the pivot locator pin 53. Film code reading member 60 also contains a light sensor in a recess behind cover plate 64, this light sensor detects film code optical signals transmitted through the scanning film by a light source contained in flint code reading member 70. Attachment of film code reading member 60 to film code reading member 70 by means of attachment screws 65 and 66 is performed in such a manner as to establish a clearance or a gap between the two opposing surfaces of film code reader frames 61 and 71, respectively.

Within film code reading member 70 is contained a film path defining means generally indicated at 80. The film path 5 of the scanning film 4 is defined in the scanning direction by an entrance film guide roller 81 mounted to the frame 71 by mounting means 88, and an exit film guide roller 82 deposed on frame 71 by mounting means 89, as shown in FIG. 3. Furthermore, a recessed convexly curved surface 91 (FIG. 5) inside film code reading member 70 provides in conjunction with two convexly curved film path rails 92 (FIG. 5), 93 adjacent to film edges 4A and 4B, a smooth motion of film along the scanning direction (see FIGS. 5 and 6 for details). Moreover, this arrangement provides beam strength across the width of the flint to properly position the film relative to rollers 83A and 83B. Confinement and film guiding in a direction perpendicular to the film scanning direction is achieved by two opposing sets of film edge guide bearings 83A and 83B, and 84A and 84B, respectively. A more detailed rendition of these sets of film edge guide bearings can be seen in FIGS. 5 and 6. Film guide bearing set 84A and 84B is deposed within a pivotable door 86 pivoting about a pivot mount 85, and being urged by a spring 90 (see FIG. 5). Precise positioning of the set of film edge guide bearings 84A and 84B relative to either of the film edges 4A or 4B is accomplished by an adjustment screw 87 which extends through door 86 against an interior surface of film code reading member 70.

Figure 5:
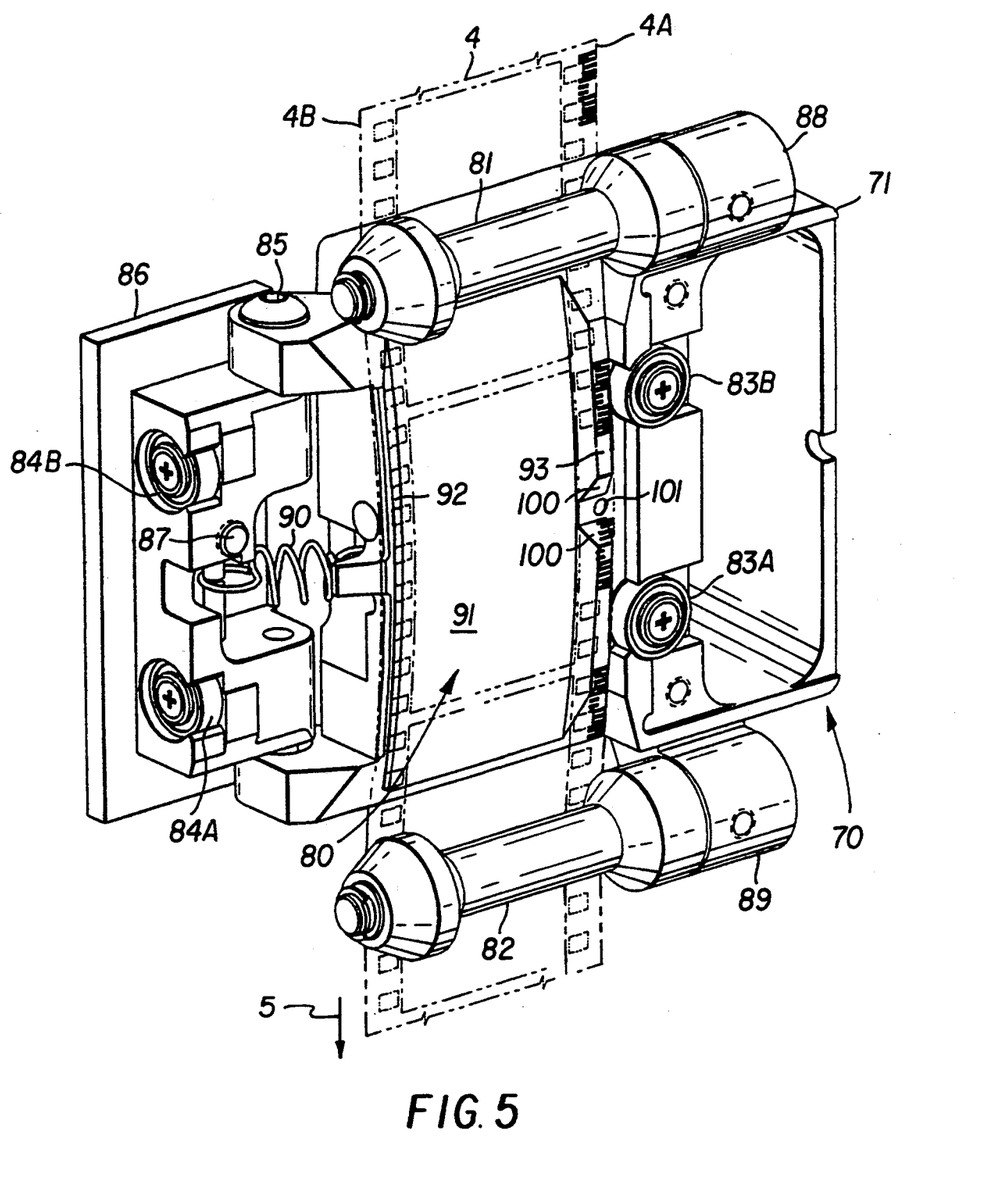
FIG. 5 is a perspective view of a second film code reading member of the film code reading assembly of the present invention, showing the major components of the film path defining means and an open door position to facilitate insertion and removal of film from this member.
Figure 6:
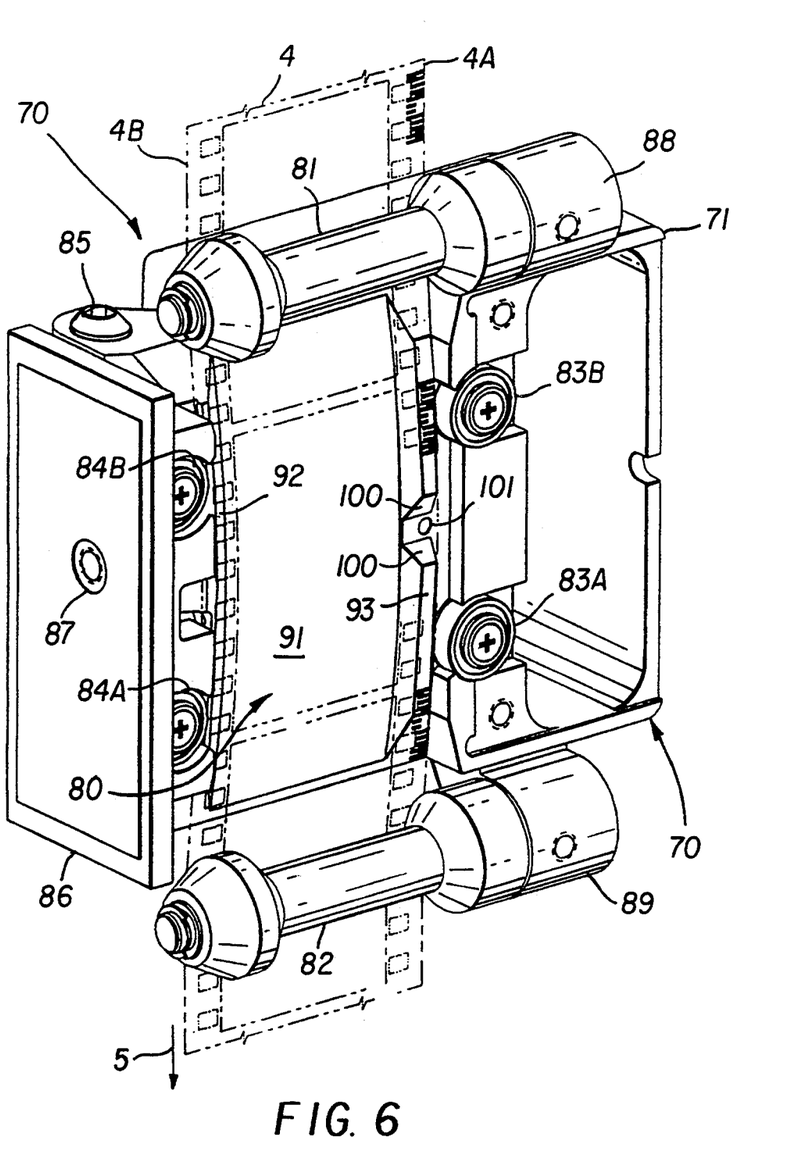
FIG. 6 provides a view similar to that shown in FIG. 5, but with the door closed, thereby indicating the film path defining function of the set of edge-guide bearings deposed in the door.

Referring now particularly to FIGS. 5 and 6, there is shown in FIG. 5 the open door position of pivotable door 86, thereby facilitating the insertion and removal of non-scanning (stationary) film into and from the film path defining guide mechanism. Also shown in FIGS. 5, 6 are raised convexly crowed film path rails 92, 93 and a recess 100 at the zenith of curvature of film path rail 93, having an aperture 101 at its base. The recessed convexly curved surface is indicated at 91. Aperture 101 provides a well-defined beam of light to the scanning film at the code reading location from a light source 104 through a second aperture 105 and a lens element 107A contained in a lens barrel 107B, all these elements being centered on a common optical axis 102 (see FIGS. 8 and 9 for details).

Thus, each one of film code reading members 60 and 70 accomplishes specific and unique objectives: film code reading member 60 contains the light sensor which transforms optical film code signals into electrical signals for storage and processing exterior to that member.

Film code reading member 60, fixedly attached to member 70 (with a gap therebetween) also serves as a structural member to provide both, a self-alignment capability of the film code reader in response to positional variation of the scanning film in a direction perpendicular to the scanning direction and a pivotably rotatable orienting capability for orienting the film code reader with respect to the one film edge carrying the film code ("first frame first" and "last frame first" modes of operation).

Film code reading member 70 provides an accurate film path and film guiding at relatively high film scan speeds, and assures a well-defined beam of light to be incident upon the film code of the scanning film at the code reading location. Furthermore, a pivotably opening and closing door facilitates the insertion and removal of film into and from member 70 in the non-scanning mode, and provides in that door a set of film edge guide bearings.

Figure 7:
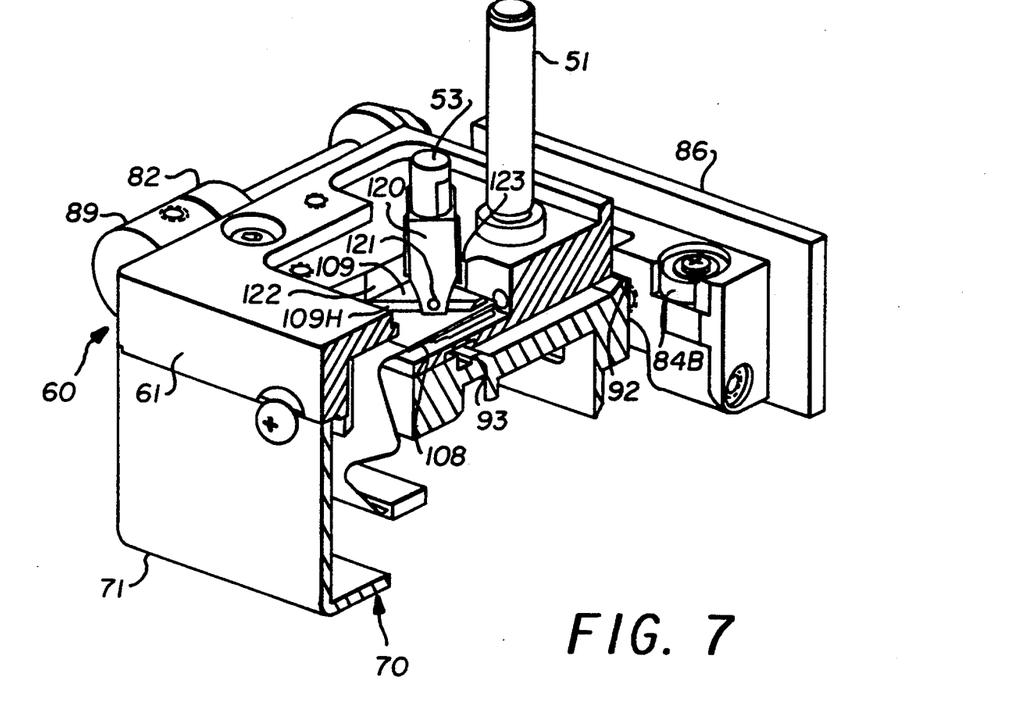
FIG. 7 is a partial break-away perspective view of a first and a second film code reading member in accordance with the invention, showing particularly the spring-urged mounting of the light sensor at its triangularly-shaped mounting surface in a recess within the first film code reading member.

Referring now to FIG. 7, there is provided a partial cross-sectional perspective view of film code reading members 60 and 70, showing the mounting of light sensor 108, with cover 64 removed from the back side of housing 61. Vertical side walls 122 and 123 meet at a corner (not shown) to form a fight angle recess. Attached to the back side of light sensor 108 is a right angle triangular plate 109 which also has vertical side walls (not shown) emanating from the right angle. The hypotenuse of that triangular plate 109 has an upwardly sloped wall face 109H. The light sensor 108 is secured in three orthogonal directions (namely against the vertical side wall recesses and pressed downwardly in the third orthogonal direction) by a spring 120 having a protrusion 121 pressing against sloped hypotenuse wall 109H. Spring 120 is fixedly held on the upper surface of housing or frame 61 by pivot locator pin 53. Of course, other mounting arrangements can be envisioned for mounting spring 120 to housing or frame 61 of film code reading member 60.

Figure 8:
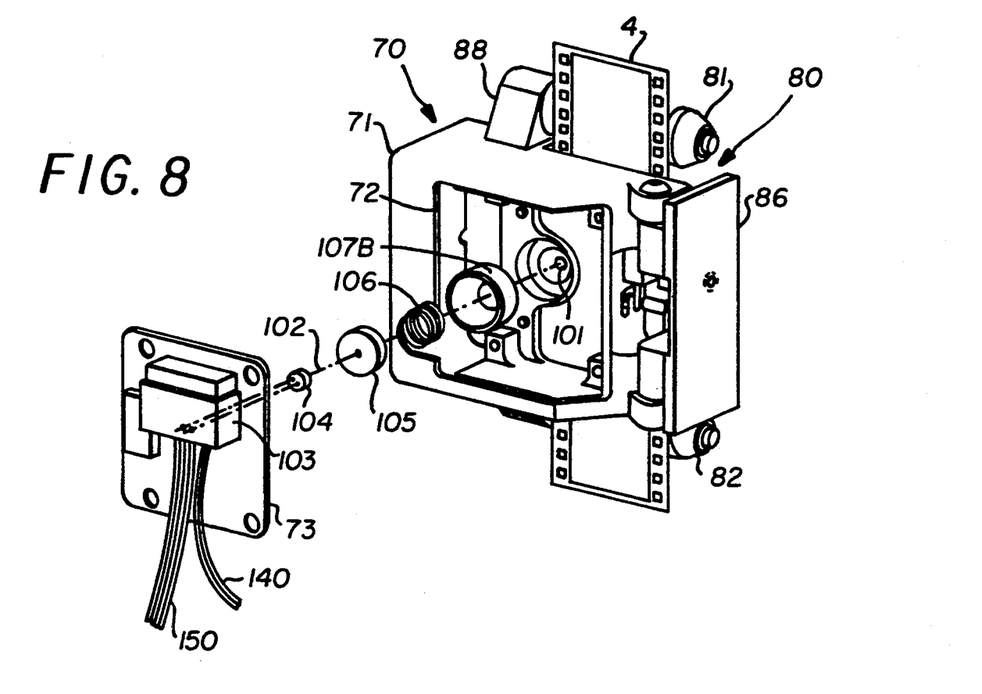
FIG. 8 is a partially exploded perspective view of the second film code reading member of the film code reader assembly in accordance with the invention, indicating particularly the optical components inserted into this member on a common optical axis.

Referring now to FIG. 8, there is shown a perspective view of film code reading member 70, as seen from the light source 104. Housing or frame 71 has an opening 72 which is covered by a cover (not shown) when the optical elements are fully assembled into housing 71. The previously mentioned aperture 101 at the base of recess 100 in film guide rail 93 is shown centered on a common optical axis 102 together with a light-emitting diode light source 104, an optical aperture element 105, a coil spring 106, and a lens 107A (see FIG. 9) in a lens barrel 107B. Upon attachment of circuit board 73 at mounting surfaces inside housing 71, the lens 107A within lens barrel 107B will be properly positioned with respect to aperture 101 to provide the highest possible defined illumination at the film code reading location. Furthermore, coil spring 106 urges the aperture 105 against the front surface of the light-emitting diode light source 104, and the spring urges lens barrel 107B toward aperture 101. Also shown in FIG. 8 is a connector block 103 attached to circuit board 73. Extending from connector block 103 are two sets of electrical connections, electrical connections 150 leading to electrical circuits exterior of film code reader assembly, and electrical connections 140 which extend from connector block 103 to the photosensor in film code reading member 60. The light-emitting diode light source 104 is also attached to connector block 103.

Figure 9:
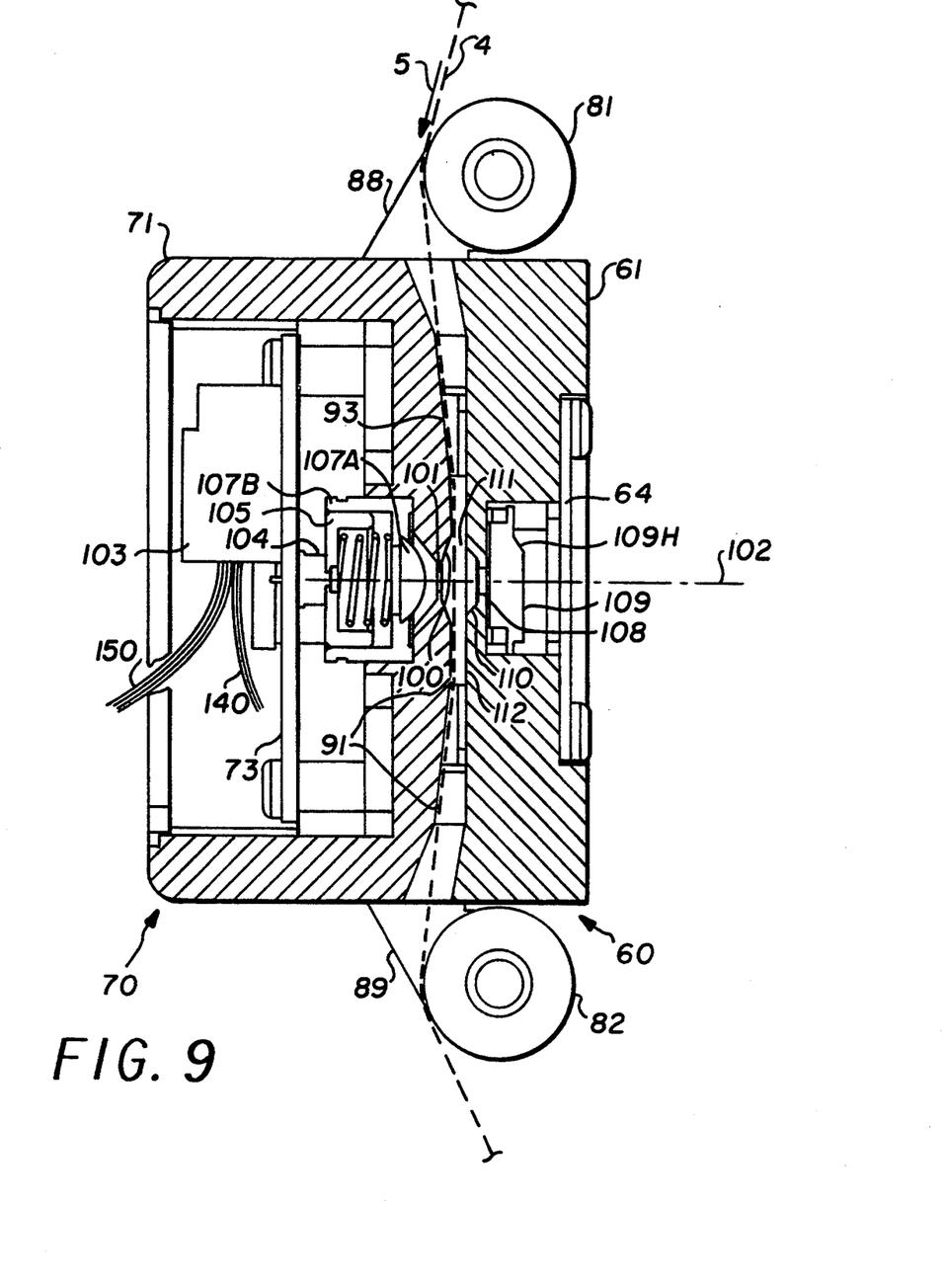
FIG. 9 is a cross-sectional side view of the film code reading means in accordance with the invention, as seen by cutting through the center of the common optical axis with a plane 9—9 in FIG. 3.

Referring now to FIG. 9, there is shown a cross-sectional side view of the film code reading members 60 and 70. At the zenith of convexly crowed film path surface of rail 93 of film code reading member 70 is depicted the recess 100 with its associated aperture 101. On film code reading member 60 is provided a recess 110 on planar surface 112, this recess leading to aperture 111 and from there to the light-sensing surface of light sensor 108. All optical elements, namely light-emitting diode light source 104, aperture 105, lens barrel 107B containing a lens 107A, as well as aperture 101, recess 100, recess 110, aperture 111, and light sensor 108 are on the common optical axis 102. The gap between film code reading member 70 and film code reading member 60 is indicated in FIG. 9. Film 4 is shown to enter the film code reader through entrance film guide roller 81, thereupon following the path of the convexly curved surface 91 of film code reading member 70 and exiting the film code reader at exit film guide roller 82.

Emanating from connector block 103 are schematically indicated electrical connections 150 connecting to electrical signal storage means and electrical supply means exterior to the film code reader assembly, and electrical connections 140 which are connected through the film code reader outside the film scanning surface to light sensor 108.

Figure 10:
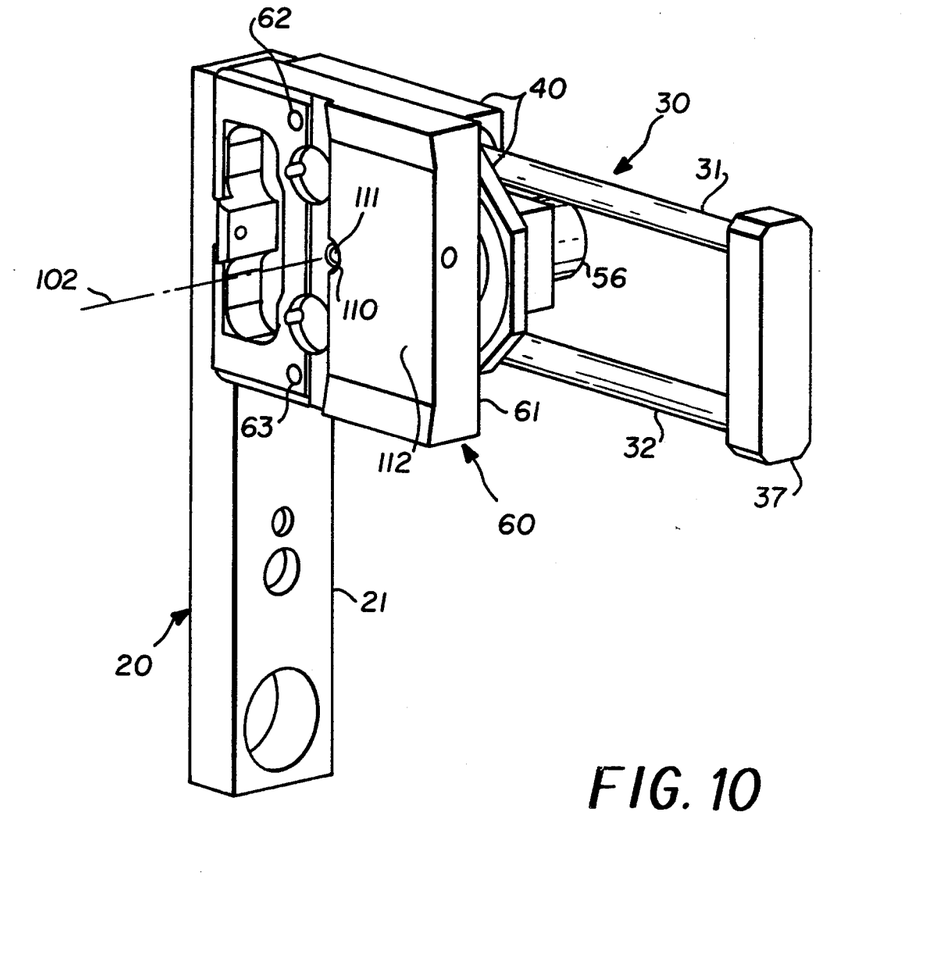
FIG. 10 is a perspective view of the first film code reading member in accordance with the present invention, as seen film the film gap between the first and second film code reading members.

Referring now to FIG. 10, there is shown film code reading member 60 as viewed from the film path surface of film code reading member 70. On the planar surface 112 and along the common optical axis 102 are indicated a recess 110 and centrally located therein an aperture 111 on frame or housing 61 of film code reading member 60.

Figure 11:
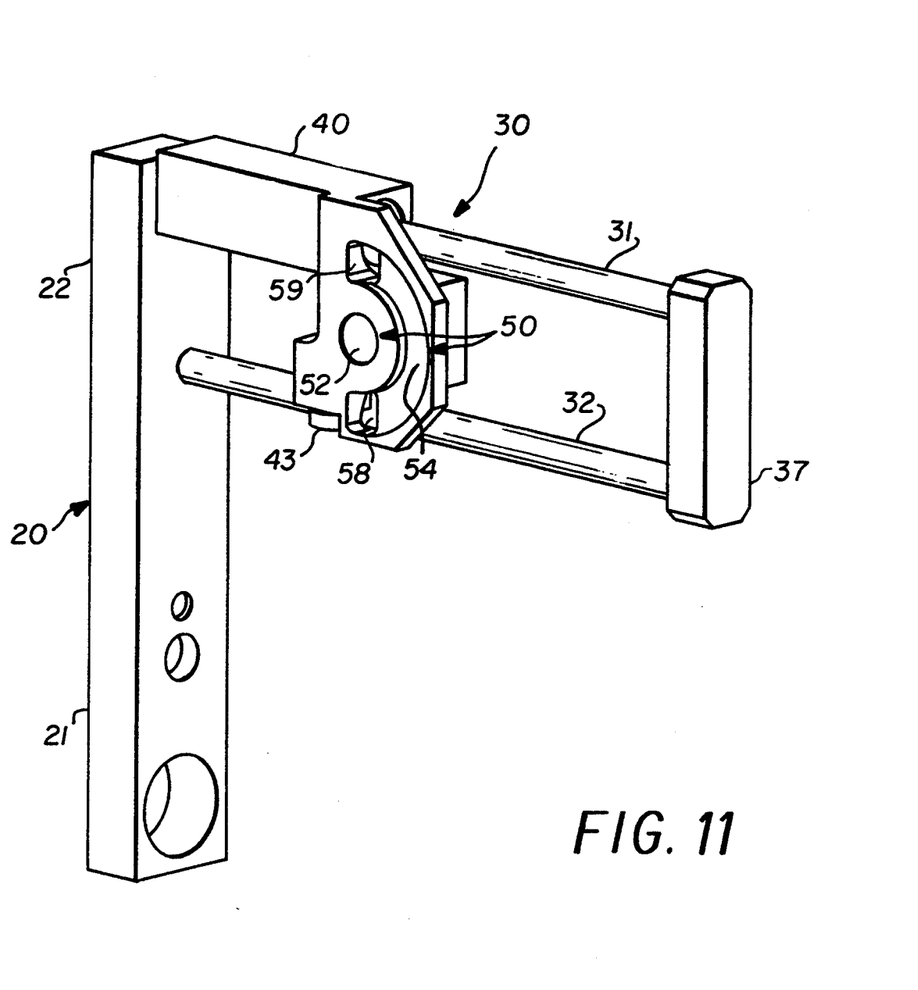
FIG. 11 is a perspective view of the pivot block, showing the bore and the semi-circular locator pin guide channel with end stops, in accordance with the present invention.

Referring now to FIG. 11, there is shown a view of pivot block 40 as seen from film code reading member 60 in the direction of pivot arm shaft 51 (see FIG. 2). Semi-circular pivot locator pin guide channel 54 terminates in end positions 58 and 59. Pivot locator pin 53 (see FIG. 2) slidably engages guide channel 54 and end stops 58 and 59, thereby assuring pivotably rotatable orientation of film code reading members 60 and 70 with respect to the film code bearing edge in the "first frame first" and "last frame first" film scan mode or configuration. The 180° semicircular guide channel 54 ensures that the flexible electrical connections 150 (see FIGS. 8 and 9) will not be continually twisted in the same direction.

From the foregoing detailed description, it will be apparent that a film code reading assembly has been provided which mounts the film code reader assembly in suitable relationship to a film scanning unit of a film scanner, and which has a defined film code reading location. The film code reader assembly of the invention further defines the path of the scanning film at the film code reading location, as well as self-alignment capability of the film code reader in a direction perpendicular to the direction of the scanning film. Additionally, the film code reader assembly of the invention provides pivotably rotatable orienting arrangement for orienting the film code reader with respect to that film edge which carries the film code. Variations and modifications of the film code reader assembly within the scope of the invention will undoubtedly suggest themselves to those skilled in this art. Accordingly, the foregoing description should be taken as illustrative and not in a limiting sense.

The invention has been described in detail with particular reference to certain preferred embodiments thereof, but it will be understood that variations and modifications can be effected within the spirit and scope of the invention.

I claim:

1. In a film scanner having a housing with internal mounting surfaces for mounting a film supply reel supplying developed and spliced film of pre-determined nominal width with optically readable film codes along either one of two edges of each frame of each film along a film path parallel with the film scanning direction past a film scanning unit to a film take-up reel, a film code reader assembly comprising:

mounting memos for mounting the film code reader assembly to a mounting surface in said housing along said film path at a position between said supply reel and said scanning unit;

film code reading means defining a code reading location;

film path defining means for defining the path of the scanning film at said code reading location;

self-alignment means for maintaining alignment of said film code reading means in response to positional variation of said scanning film in a direction perpendicular to said scanning direction; and pivotably rotatable orienting means for orienting said film code reading means with respect to said one film edge having said film code.

2. The film code reader assembly of claim 1, wherein said mounting means comprises a mounting arm having first and second arm portions, said first arm portion mountable to one of said internal mounting surfaces of said housing.

3. The film code reader assembly of claim 2, wherein said self-alignment means comprises:

a top and bottom guideshaft fastened at one shaft end to said second arm portion in spaced relationship and extending perpendicularly outwardly from said arm;

an end block confining the other end of said guideshafts;

a pivot block slidably deposed on said top and bottom guideshafts; and means for attaching said film code reading means to said pivot block.

4. The film code reader assembly of claim 3, wherein said pivotably rotatable orienting means comprises:

a pivot arm shaft fixedly attached to said film code reading means and rotatably deposed in a bore of said pivot block in an orientation perpendicular to said guideshafts and perpendicular to said arm, said pivot block having two end stops of a semi-circular locator pin guide channel;

a pivot locator pin fixedly attached to said film code reading means and extending slidably into a selected one of said two end stops of said semi-circular locator pin guide channel in said pivot block; and spring-urged retaining means for retaining said pivot arm shaft and said pivot locator pin in said pivot block.

5. The film code reader assembly of claim 4, wherein said film code reading means comprises:

a first and a second film code reading member fixedly attached to one another with a gap therebetween extending along the path of the scanning film, said second film code reading member having a film exiting location; and a source of light and a light sensor deposed on a common optical axis extending between said first and second members and through said film and said gap at said code reading location within said code reading means, such optical aperture means and lens means being provided on said common optical axis between said source of light and said light sensor.

6. The film code reader assembly of claim 5, wherein said film path defining means comprises:
- an entrance film guide roller deposed on said second film code reading member adjacent to a film entering location;
- an exit film guide roller deposed on said second film code reading member adjacent to said film exiting location;
- a first set of two film edge guide bearings deposed on said second film code reading member for defining said code reading location of said one edge of said film having said optically readable film codes;
- a second set of two film edge guide bearings deposed on a pivotably opening and closing door attached to said second film code reading member for defining the location of the film edge opposite said one edge with said codes when said door is in a closed position;
- a recessed convexly curved surface of said second film code reading member along said film path of said scanning film;
- a first raised convexly curved film path rail defining a first side termination of said curved surfaces of said second member and proximate said first set of film edge guide bearings;
- a second raised convexly curved film path rail defining a second side termination of said curved surfaces of said second member and proximate said second set of two film edge guide bearings; and
- a planar surface on said first film code reading member opposite and coextensive with said first raised convexly curved rail and defining a gap therebetween.

7. The film code reader assembly of claim 6, wherein said film code reading means further comprises:
- a recess at the zenith of said first raised convexly curved film path rail on said second film code reading member, said recess having at its base an optical aperture which provides an optical path along said common optical axis to said lens means, to another optical aperture and to said source of light; and
- a recess in said planar surface on said first film code reading member, said recess located opposite said recess in said first curved rail on said common optical axis, and having at its base an optical aperture which provides an optical path to said light sensor.

8. The film code reader assembly of claim 6, wherein film insertion into and film removal from said film gap between said first and second film code reading member occurs in a non-scanning mode of said film when said pivotably opening and closing door is in an open position.

9. The film code reader assembly of claim 5, wherein said source of light is a light-emitting diode and said light sensor provides electrical output signals representative of said film codes to electrical storage and control circuits exterior of said code reader assembly.

10. The film code reader assembly of claim 7, wherein said light sensor in said first film code reading member has a light-sensing surface and an opposing mounting surface, said light-sensing surface facing said recess in said planar surface.

11. The film code reader assembly of claim 10, wherein at least a portion of said light sensor mounting surface is substantially triangular with one right angle opposite a hypotenuse side, the right angle sides having vertical side walls and the hypotenuse side having a sloped side wall.

12. The film code reader assembly of claim 11, wherein said light sensor is deposed in a right angle recess in said first film code reading member and held aligned therein by a sensor mounting spring exerting forces in three orthogonal directions against said sloped side wall of said light sensor mounting surface.

* * * * *